United States Patent [19]
Fiel et al.

[11] Patent Number: 5,414,927
[45] Date of Patent: May 16, 1995

[54] FURNACE ELEMENTS MADE FROM GRAPHITE SHEETS

[76] Inventors: Larry D. Fiel, Rte. 1, Box 132, Decatur, Tex. 76234; Jamie Lorzadeh, 2916 Creekwood La., Fort Worth, Tex. 76123

[21] Appl. No.: 39,890

[22] Filed: Mar. 30, 1993

[51] Int. Cl.6 .................................................. H01R 43/00
[52] U.S. Cl. ............................................ 29/825; 29/611; 373/110; 373/111; 373/117; 373/118
[58] Field of Search ............... 373/110, 111, 117, 118, 373/134; 29/825, 611

[56] References Cited

U.S. PATENT DOCUMENTS

| | | |
|---|---|---|
| 2,491,579 | 12/1949 | Poland . |
| 2,650,254 | 8/1953 | Kremers . |
| 2,966,537 | 12/1960 | Witucki et al. . |
| 3,004,090 | 10/1961 | Donovan et al. . |
| 3,359,077 | 12/1967 | Arst . |
| 3,506,771 | 4/1970 | Cole . |
| 3,525,795 | 8/1970 | Westeren et al. . |
| 3,798,007 | 3/1974 | Bochman et al. . |
| 4,126,757 | 11/1978 | Smith, Jr. et al. ............... 13/25 |
| 4,410,796 | 10/1983 | Wilsey . |
| 4,503,319 | 3/1985 | Moritoki et al. ............... 219/390 |
| 4,549,345 | 10/1985 | Wilsey . |
| 4,703,556 | 11/1987 | Wilsey ............... 29/611 |
| 4,732,620 | 3/1988 | Hunold et al. . |
| 4,755,658 | 7/1988 | Wilsey . |
| 4,856,022 | 8/1989 | Jones ............... 373/112 |
| 4,860,306 | 8/1989 | Gibb ............... 373/112 |
| 4,888,242 | 12/1989 | Matsuo et al. ............... 428/408 |
| 4,990,755 | 2/1991 | Nishimura . |

FOREIGN PATENT DOCUMENTS

| | | |
|---|---|---|
| 2025904 | 11/1970 | France . |
| 160256 | 5/1983 | Germany . |
| 1124328 | 8/1968 | United Kingdom . |
| 1124330 | 8/1968 | United Kingdom . |
| 1181935 | 2/1970 | United Kingdom . |
| 1181937 | 2/1970 | United Kingdom . |
| 571099 | 8/1994 | United Kingdom . |

OTHER PUBLICATIONS

Growing Semiconductor Crystals Using the Czochralski Method, Walter Helgeland, V.P.; Ken Kerwin, Manager of Engineering and Development; and Carl Chartier, Chief Process Engineer Systems Equipment Div., Ferrofluidics Corp., Nashua, N.H., 1983, pp. 1–6.

Primary Examiner—Carl J. Arbes
Attorney, Agent, or Firm—William O. Jacobson; Gregory F. Wirzbicki

[57] ABSTRACT

A high strength graphite material is fabricated into a sheet, the sheet is bent into a tube, and the tube is retained in that shape for use in a high temperature furnace. The retained tube is rigid and can replace prior art machined blocks of lower strength graphite in a furnace. The tube can also be further machined and/or further deformed to achieve more complex shapes.

13 Claims, 6 Drawing Sheets

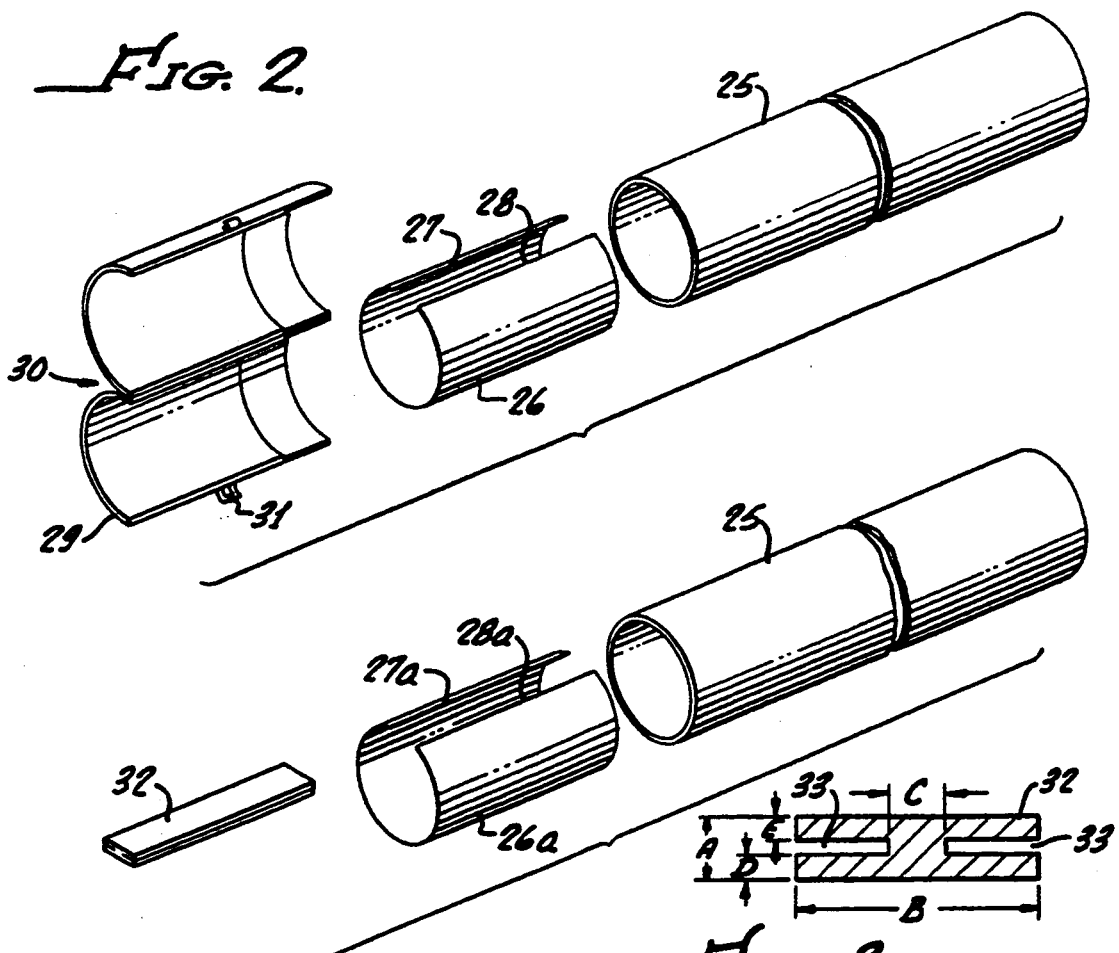
FIG. 2.
FIG. 3.
FIG. 3a.
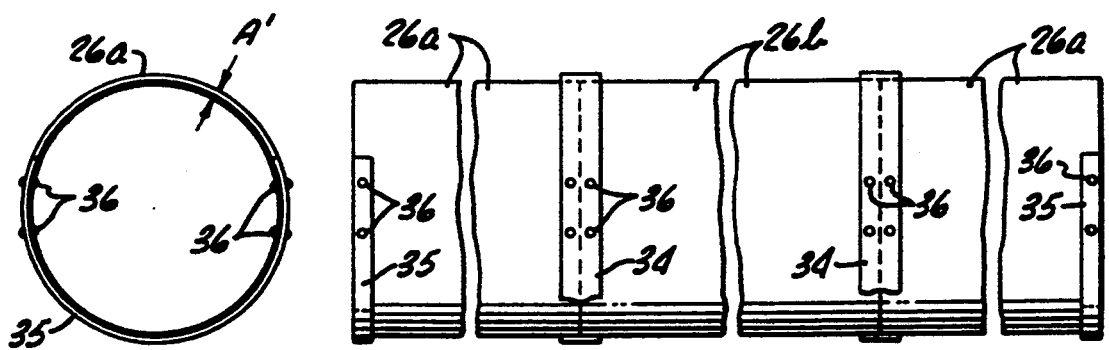
FIG. 4b.
FIG. 4a.

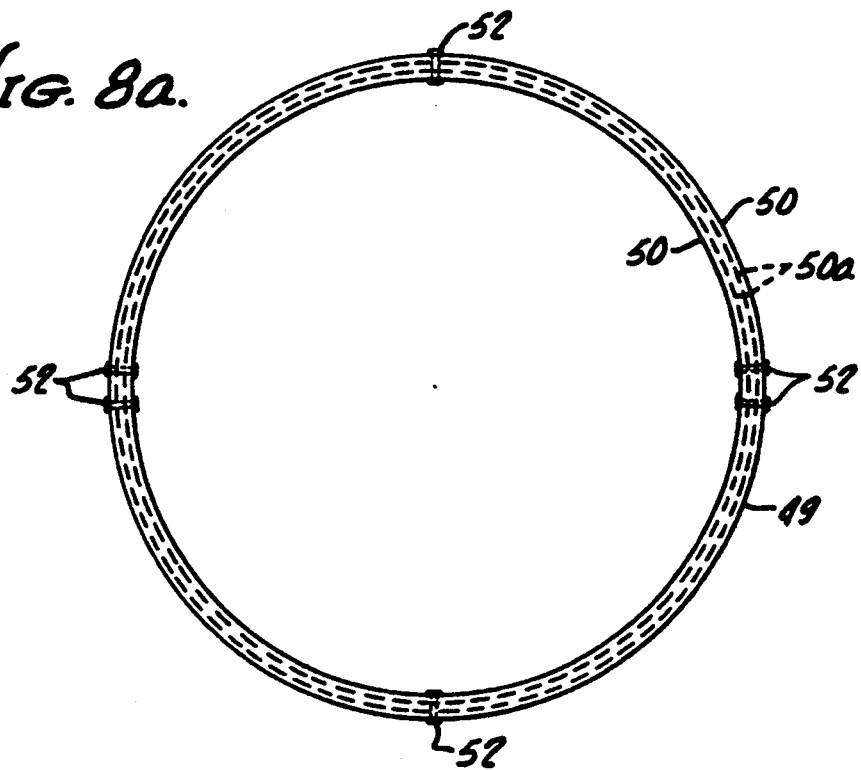
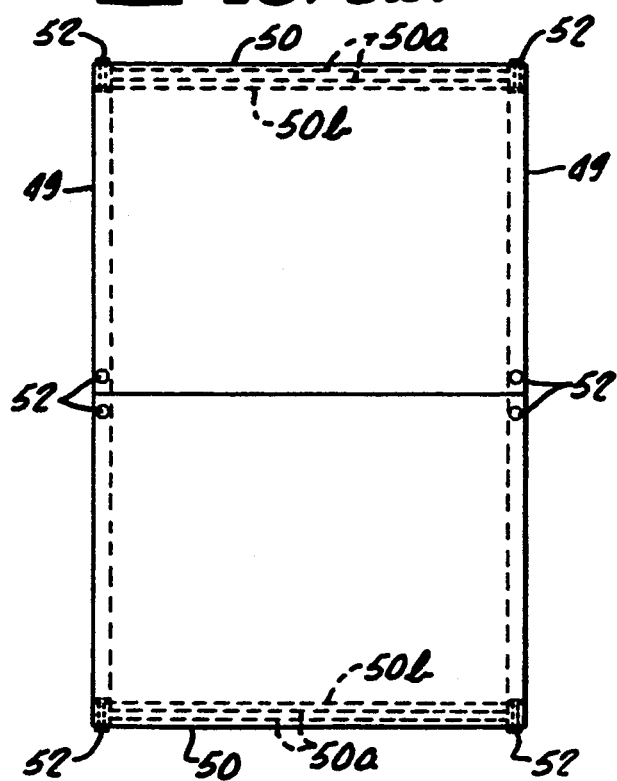
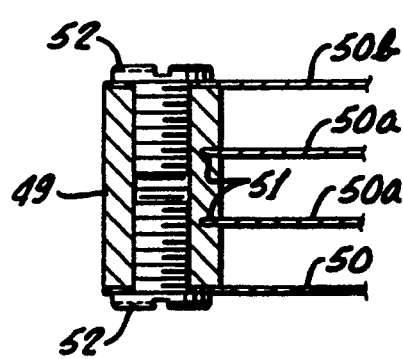

FURNACE ELEMENTS MADE FROM GRAPHITE SHEETS

FIELD OF THE INVENTION

This invention relates to the fabrication of graphite devices. More specifically, the invention is concerned with the fabrication of graphite furnace elements, such as heaters, heat shields, and protective liners.

BACKGROUND OF THE INVENTION

Many industrial processes are accomplished within a furnace, e.g., processes that require temperatures of at least about 200° C., typically at least 1500° C. for a high temperature furnace. In some furnace processes, such as chemical vapor deposition or semiconductor crystal growing using the Czochralski method, temperature uniformity must be carefully controlled simultaneously with high temperature heat transfer.

Graphite elements are sometimes used in these furnaces. For example, in semiconductor crystal growing applications, a graphite cup may support the melt container, and a cylindrical graphite "picket fence" heating element is the heat source. Precise and complex shapes of the graphite furnace elements may be required to accomplish their structural and thermal functions.

Because of the brittle nature and low strength of prior graphite materials used to construct furnace elements, graphite furnace elements were typically fabricated and shaped by machining from blocks of graphite. For cylindrical or cup-like shapes, this required the removal of significant amounts of graphite. Because of the amount of material removed (and the disposal of the removed materials), graphite machining was a long, slow, and expensive process.

SUMMARY OF THE INVENTION

Such machining problems are minimized in the present invention by forming a flexible graphite sheet into a complex shape and retaining the formed shape in a more rigid structure such as a cylinder. The sheet is composed of one or more graphite materials having fine particle sizes and high strength which can typically be made in thicknesses from about 0.005 to 0.20 inches (0.0127 to 0.508 cm), more typically less than about 0.1 inch (0.254 cm) thick. Distorting the graphite sheet to form a cylindrical shape and retaining the distorted shape can also be accomplished by heat treatment while being mechanically constrained.

The shaped graphite sheets can also be machined before or after being distorted. Machining of the sheets is less costly than graphite block machining because of the reduced amount of machining required for a typical sheet and the properties of the graphite sheet.

The graphite sheets can be used to form complex elements for various functions in the furnace, such as heaters, heat shields, liners, and supports. The uniform electrical properties, purity, and shaping of the graphite sheets provide precision heating control. The elasticity of the formed sheets can be used to removably retain the elements in the shaped position without separate fittings or clamps.

These advantages are especially important for semiconductor crystal growing and vapor deposition furnace applications where precise geometries of furnace elements are required. In addition, contamination of graphite elements, such as unwanted deposition of vapor, can be more easily removed from graphite sheets by acid cleaning or other means without damage to the graphite.

BRIEF DESCRIPTION OF THE DRAWINGS

FIG. 2 shows a graphite liner;

FIGS. 3 and 3a show a view and a detail of an alternative graphite liner;

FIGS. 4a and 4b show end and side views of a rigid graphite liner;

FIGS. 8a, 8b and 8c show top and side views and a detail of a radiation heat shield.

In these Figures, it is to be understood that like reference numerals refer to like elements or features.

DETAILED DESCRIPTION OF THE INVENTION

Figure 1A:
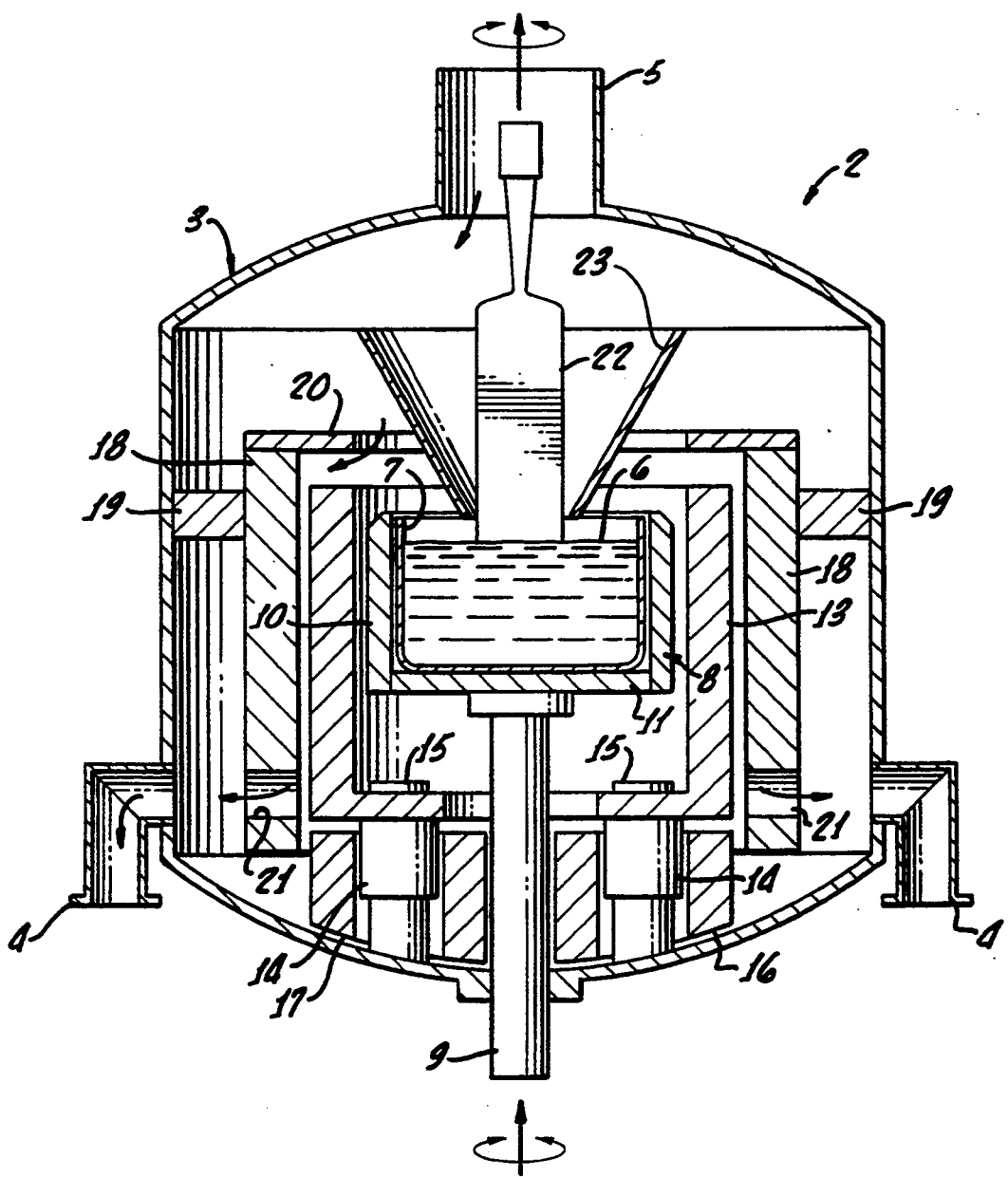
FIG. 1a shows a cross-sectional schematic view of a furnace including an embodiment of the invention.

FIG. 1a shows a cross-sectional view of a silicon crystal growing furnace system. The metal tank or chamber 3 is designed for furnace-like high temperatures and vacuum conditions. The chamber 3 can be evacuated through pumping ports 4 to a pressure (vacuum) typically no more than about $10^{-6}$ Torr or is pressurized with an inert gas, such as argon, to a typical pressure slightly above one atmosphere, but the pressure (vacuum) more typically ranges from 0.1 to 50 Torr. Inert gas flow, shown as arcuate arrows, can also be conducted from the neck 5 of the chamber 3 through the pumping ports 4.

A silicon melt 6 from which a solid crystal is grown must be controlled within a narrow temperature range, e.g., between about 1410° to 1420° C. Although larger temperature ranges are possible, temperature fluctuation within the range is rarely allowed to vary more than ±1° C. The temperature controlled melt 6 is held in a crucible 7, typically composed of quartz. The crucible 7 is supported by a graphite cup 8 which is rotated on shaft 9.

Figure 1B:
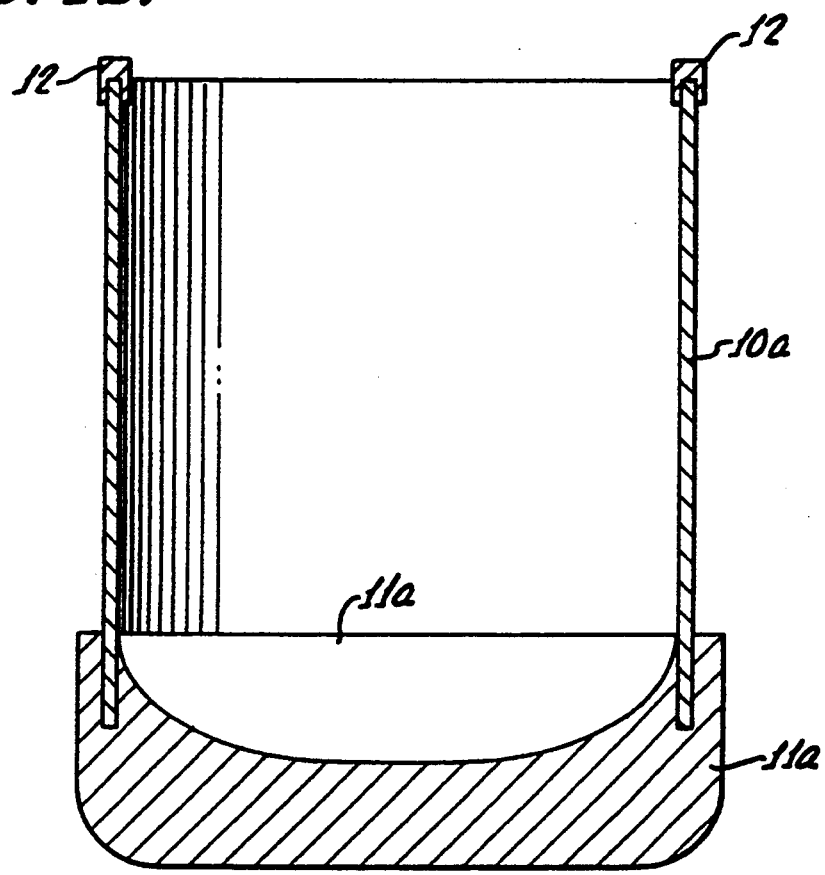
FIGS. 1b and 1c show a graphite cup assembly.
Figure 1C:
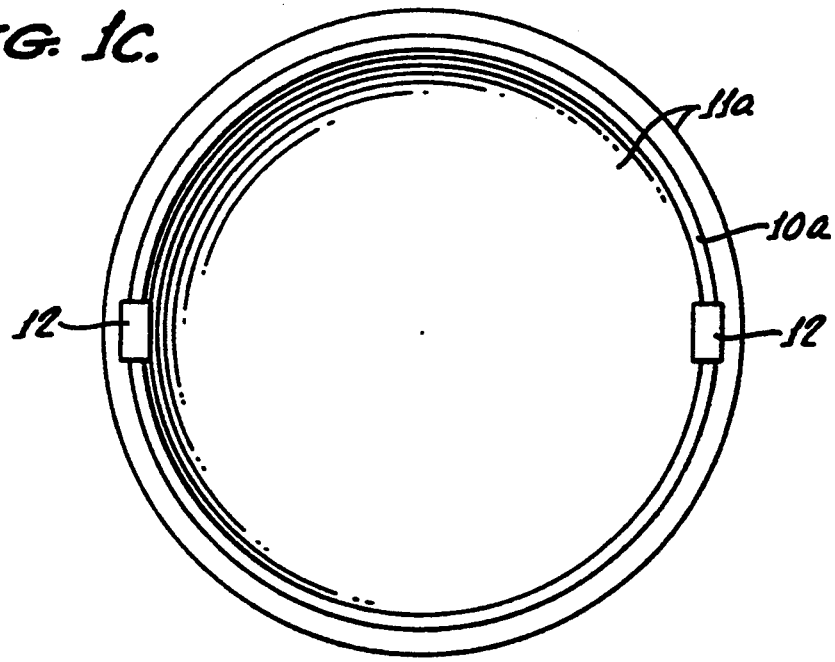

In this embodiment of the invention, the graphite cup 8 is not machined from a graphite block but fabricated from several (relatively thin) graphite sheets comprising a cylindrical portion 10a and an attached disc-like bottom portion 11a (see FIGS. 1c and 1b). The crucible 7 rests on and is supported by the graphite bottom portion 11a.

The wall thickness of the graphite sheets used for cylindrical portion 10a typically ranges from about 0.02 to 0.10 inch (0.0508 to 0.254 cm), more typically ranging from 0.02 to 0.08 inch (0.0508 to 0.2032 cm). The graphite sheets for the cylindrical portion 10a of the graphite cup 8 are initially flat, but are formed or bent into a cylindrical shape and retained in the cylindrical shape. The retention can be accomplished by inserting the cylindrical portion 10a into a groove in the bottom portion 11a and using a retaining clip 12 at the top (as shown in FIG. 1b). Various other shaped or formed sheet retaining means can also be used, including temporarily retaining the shaped graphite sheet and heat treating to a set temperature.

The cylindrical portion 10a shown in FIGS. 1b and 1c has an outside diameter typically ranging from about 3 to 38 inches (7.62 to 96.52 cm), more typically ranging from about 10 to 22 inches (25.4 to 55.88 cm). The length of the cylindrical portion 10a typically ranges from about 4 to 30 inch (10.16 to 76.2 cm), more typically ranging from about 8 to 18 inches (20.32 to 45.72 cm).

The bottom portion 11a shown in FIGS. 1b and 1c is essentially a concave, circle-shaped graphite element. The thickness of bottom portion 11 sheet may be greater than the wall thickness of the cylindrical portion 10a in order to provide adequate support for the crucible 7. Alternative embodiments of the bottom portion 11a may have attached ribs for added structural integrity and other means for attaching to the cylindrical portion 10a such as graphite screws.

The graphite bottom portion 11a shown in FIGS. 1b and 1c is contoured to conform to the shape of the bottom of the crucible 7 and securely support it. The bottom portion 11a is expected to be reusable, whereas the cylindrical portion 10a may be replaced periodically. The bottom piece 11a is machined from a block of graphite.

The temperature of melt 6 shown in FIG. 1a is primarily controlled by a resistance-type graphite heating element 13. The heating element 13 is generally cylindrical in shape and supported by posts 14 which also serve as electrical feed-throughs. As an electrical potential is impressed between feed-throughs 14, the sheet's resistance around the circumference of the heating element generates heat.

Fabrication of the heating element 13 and attachment tabs 15 use several sheets of graphite which are attached to the two terminal posts 14. Details of a preferred heating element 13 are shown in FIGS. 5, 6, and 7 and forming of the graphite sheet which composes the heating element 13 is later discussed. Alternatively, the sheets are attached to terminal posts which are machined from a graphite block.

The furnace apparatus 2 may include other protective elements. The supports/feed throughs 14 are partially enclosed by protective elements 16 and 17, usually composed of glass or ceramic. The walls of chamber 3 are protected from radiation heat transfer by a wall heat shield 18 and attached flange 19 and ring 20. Heat shields 18 are constructed from multiple layers of graphite sheets which are bent and retained in the bent shape, generally a cylindrical shape. The desired geometry (shape) of the protective elements may also be accomplished by machining before or after bending and retaining into the desired shape.

The wall thickness of the graphite sheet used for heat shields can theoretically be quite thick, e.g., 0.5 inch (1.27 cm) or more, but practical forming considerations typically limit the sheet's thickness to a range from about 0.01 to 0.1 inch (0.0254 to 0.254 cm), more typically ranging from about 0.02 to 0.06 inch (0.0508 to 0.1524 cm). Ports 21 allow a fluid flow path through the wall heat shield 18 for inert gas to be withdrawn from the chamber 3. The ports 21 can be drilled or otherwise machined in the graphite sheet before or after other bending or deforming steps. Other details of the heat shield are shown in FIGS. 8a, 8b and 8c and forming is later discussed.

Other optional inert gas baffles and/or heat shield elements may also be placed in the furnace 2 to control the growing silicon crystal 22 being drawn from the melt 6. One optional element is a funnel shield 23 that may be placed proximate to the silicon crystal 22. The funnel shield 23 (or other additional furnace elements) can further control heat transfer to and from the growing crystal 22 or other parts of the furnace, if required and direct the inert gas flow over the melt. These additional furnace elements can also be fabricated from thin graphite sheets and attached as herein described for other graphite elements. It will be understood by those skilled in the art that the graphite elements may control or be attached to other components which are also typically present in the furnace assembly, but are not included for clarity, e.g., viewing ports, access flanges, and crystal pulling devices.

The thickness and composition of the flexible graphite sheets allow for the deformations required to fabricate the various furnace elements. The composition is preferably a fine particle size, high strength graphite material, such as Poco Graphite Grades DFP-2 or SFG-2, supplied by Poco Graphite, Inc. located in Decatur, Tex. Table 1 provides typical physical properties of a preferred graphite material which can be made into flexible thin sheets. These material properties, combined with the substantially smooth sheet surfaces, permit the sheet to be bent and fabricated into furnace elements, especially high-temperature furnace control elements.

TABLE 1

| PREFERRED PHYSICAL PROPERTIES OF SHEET GRAPHITE | |
|---|---|
| Property (at room temperature) | Typical Value |
| Density (g/cc) | 1.75–1.8 |
| Hardness (Shore Scleroscope) | 65–76 |
| Flexural Strength | |
| (psi) | 10,000–18,000 |
| (Kg/cm$^2$) | 700–1260 |
| Compressive Strength | |
| (psi) | 16,000–32,000 |
| (Kg/cm$^2$) | 1120–2240 |
| Thermal Conductivity | |
| (BTU-ft$^2$-hr-°F.) | 60–70 |
| (Cal-cm/cm$^2$-sec-°C.) | 0.25–0.29 |
| Coef. of Thermal Expansion (cm/cm/°C.) | 7.5–8.5 × 10$^{-6}$ |
| Electrical Resistivity (micro-ohms in) | 450–1200 |

A key physical property of the preferred graphite materials is their relatively isotropic properties, such as electrical resistivity. In contrast, many graphite materials are anisotropic, having different properties in different directions. The isotropy minimizes hot spots and avoids the need for additional controlling of orientation of the fabricated elements.

Another key property of the preferred graphite materials is their high flexural strength typically ranging from about 10,000 to 18,000 psi (700 to 1260 Kg/cm$^2$) relative to graphite previously used for graphite furnace elements. In contrast, most carbon and graphite materials for high temperature service have a typical flexural strength ranging from about 4000 to 6000 psi (281.24 to 421.86 Kg/cm$^2$). In addition, prior graphite materials were usually anisotropic, resulting in even lower flexural strength in some directions. In contrast, a typical flexural strength of at least 8,000 psi (562.5 Kg/cm$^2$), preferably at least about 10,000 psi (703.1 Kg/cm$^2$), more preferably at least about 12,000 psi (843.72 Kg/cm$^2$), and even more preferably at least about 14,000 psi (984.34 Kg/cm$^2$), is required to allow the sheets to be elastically flexed, bent, or formed into complex shapes, e.g., the sheet of high strength graphite can be significantly distorted without cracking.

Still another important property of these graphite materials is their uniform microstructure. The uniform microstructure also allows the material to be fabricated into relatively thin sheets and bent around forms without breaking.

FIG. 2 is an exploded view of a graphite liner for a high temperature silicon oxide vapor deposition tube furnace (not shown). Vapor deposition processes are typically accomplished within a furnace at temperatures ranging from about 200° to 800° C. A quartz tube 25 is a typical prior art furnace element within which the vapor deposition occurs. However, unwanted silicon oxide deposition would occur on the quartz tube 25, requiring periodic removal from the furnace and cleaning of the quartz tube 25.

The present invention adds a formed graphite tube liner 26 to the interior of the quartz tube 25. The liner's cylindrical shape has an outer diameter slightly smaller than the inside diameter of the quartz tube 25 to allow insertion and removal of the tube liner 26 into the quartz tube 25. The initial deformation of a graphite sheet forming the tube liner 26 may plastically deform (i.e., take a permanent set) the graphite sheet, but at least a portion of the deformation is elastic (i.e., a bias force must be exerted to retain the graphite sheet in its formed shape). Although the partially formed first and second lengthwise edges 27 and 28 are shown spaced apart from each other in FIG. 2, the inserted (more fully formed) liner shape places the lengthwise edges 27 & 28 in an abutting or overlapping position.

Even though the thin graphite sheets which comprise the tube liner 26 are flexible and relatively easily deformed when unrestrained, the restrained cylindrical shape and strength of the preferred graphite materials of construction provide structural integrity. If more structural integrity for a liner is required, a thicker sheet or additional reinforcing means can be used, such as ribs.

The thickness of the liner 26 can typically range from about 0.01 to 0.04 inch (0.0254 to 0.1016 cm), but more typically ranges from about 0.02 to 0.03 inch (0.0508 to 0.0762 cm). The outside diameter of the tube liner 26 when inserted into the quartz tube 25 can typically range from about 4 to 12 inches (10.16 to 30.48 cm), but more typically ranges from about 6 to 10 inches (15.24 to 25.4 cm). A sheet composed of fine particle size, high strength graphite allows sheet shaping into an arc having a radius of curvature of as small as 2 inches (5.08 cm) or less without cracking.

A temporary means for retaining the tube liner 26 in the fully formed shape is an insertion/extraction fixture 29. The clamshell-like insertion/extraction fixture 29 has a hinge 30 and a clasp 31, allowing the fixture to close, forming the liner 26 fitting within the inside diameter of quartz tube 25. The fixture 29 (holding tube liner 26) is positioned at the end of the quartz tube 25 so the liner 26 can be slid into tube 25. After inserting and fixture unclamping, the formed graphite sheet is frictionally retained in the quartz tube 25 and the fixture 29 is withdrawn. When removal of liner 26 from quartz tube 25 is required, e.g., for cleaning, one end of the extraction fixture 29 is fixtured to the end of the quartz tube 25, and the tube liner 26 is withdrawn into fixture 29, which is then opened up to allow removal of the graphite sheet.

The means for retaining the partially formed shape of the tube liner 26 in the quartz tube 25 is the quartz tube itself. The quartz tube 25 exerts a bias force on the partially relaxed, but still cylindrically formed liner 26, thereby attaching (by means of the frictional forces resulting from the outward bias force) the tube liner into a position within the tube liner. An assembly view of an alternative tube liner 26a and quartz tube 25 is shown in FIG. 3. Instead of having abutting or overlapping edges 27 and 28, the edges 27a and 28a of alternative liner 26a are inserted into a lengthwise retaining rib 32 prior to inserting the liner into quartz tube 25. An end cross-sectional view of the retaining rib 32 is shown in FIG. 3a. The liner 26a is formed by a shaping force which places the edges 27a and 28a deep into slots 33 of retaining rib 32, forming a cylinder having an outside diameter slightly smaller than the inside diameter of the quartz tube 25.

The slots 33 can be shaped to allow a sliding fit of edges 27a & 28a. After placement of the formed liner 26a and (slidable) retaining rib 32 into the quartz tube 25, the shaping force can be relaxed so that the edges 27a and 28a will partially retreat from the deep position to a shallow position within the slots 33 as the liner outer diameter expands into the inner surface of the quartz tube 25.

The retaining rib 32 and slots 33 are shaped and dimensioned to still cover the edges 27a and 28a when or if liner 26a expands within the quartz tube 25. For a preferred graphite liner 26a having a thickness of about 0.025 inch (0.0635 cm) and having a formed diameter of about 6 to 8 inches (15.24 to 20.32 cm), the nominal overall thickness "A" of rib 32 is expected to be about 0.10 inch (0.25 cm), but typically ranges from about 0.060 to 0.2 inches (0.1524 to 0.508 cm), the nominal overall length "B" of rib 32 is expected to be about 0.40 inch (1.02 cm), but typically ranges from about 0.2 to 0.5 inches (0.508 to 1.27 cm), the nominal non-slot length "C" of rib 32 is expected to be about 0.10 inch (0.25 cm), but typically ranges from about 0.05 to 0.15 inches (0.127 to 0.381 cm), the nominal lower slot wall thickness "D" of rib 32 is expected to be about 0.035 inch (0.089 cm), but typically ranges from about 0.02 to 0.06 inches (0.0508 to 0.1524 cm), and the nominal upper slot wall thickness "E" of rib 32 is expected to be about 0.04 inch (0.102 cm), but typically ranges from about 0.02 to 0.06 inch (0.0508 to 0.1524 cm). To completely cover the inside of tube 25, multiple sheets similar to sheets 26 or 26a may be required.

An end and side views of an alternative rigid liner 26b are shown in FIGS. 4a and 4b. The rigid design of the alternative liner 26b allows easy insertion and removal from quartz tube 25. As shown, a plurality of lengthwise graphite sheet sections (of the alternative liner 26b) are attached to one another by one or more support rings 34. To achieve the required length and allow access, a partial ring end support 35 is used at each end. Both support rings 34 and end supports 35 are attached to the graphite sheets composing alternative liner 26b with graphite screws 36.

For an alternative rigid liner 26b composed of fine particle size, high strength graphite, having a nominal thickness of about 0.030 inch (0.0762 cm) and a nominal radius of curvature of about 3 to 4 inches (7.62 to 10.16 cm), the nominal overall thickness "A'" of support ring 34 and end ring 35 is typically about 0.15 inch (0.381 cm), but may typically range from about 0.1 to 0.2 inch (0.254 to 0.508 cm). The nominal overall length of support ring 34 is typically about 1.2 inches (3,048 cm), but may typically range from about 0.8 to 2 inches (2.032 to 5.08 cm).

Figure 5A:
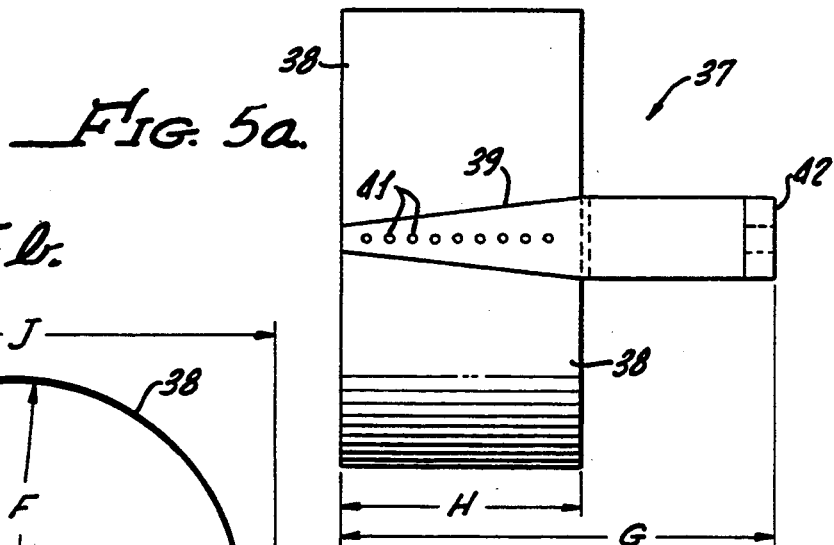
FIGS. 5a and 5b show side and top views of a heater assembly.
Figure 5B:
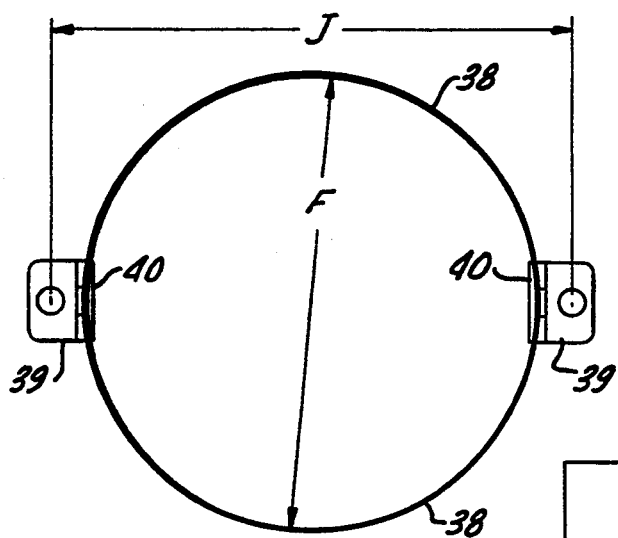

FIGS. 5a and 5b are side and top views of a furnace heater assembly 37. The heater assembly 37 includes two thin sheets of graphite formed into semi-circular or shell shaped heating elements 38. Each of the heating elements 38 is preferably composed of a fine particle-size, high strength graphite sheet having the properties as shown in Table 1 and a nominal thickness of 0.025 inch (0.0635 cm), but the thickness typically ranges from about 0.01 to 0.08 inch (0.0252 to 0.2032 cm). The graphite sheet for the heating element 38 is bent or formed into semi-circular shape having a nominal inside diameter "F" of about 16 inches (40.64 cm), but inside diameters may typically range from about 6 to 30 inches (15.24 to 76.2 cm) and be out of round by ±0.25 inch (0.635 cm) or more.

The overall height "G" of the heater assembly 37 typically ranges from about 4 to 40 inches (10.16 to 101.6 cm). The length "H" of the formed heating elements 38 typically ranges from about 8 to 30 inch (20.32 to 76.2 cm).

The formed heating elements 38 are each retained in the shell shape by two rigid terminal blocks 39 and two rigid terminal strips 40 fastened together with a plurality of bolts 41. The terminal blocks 39, the terminal strips 40, and the bolts 41 are also preferably composed of a fine particle size, high strength graphite.

Both of the connector ends 42 of the terminal blocks 39 are electrically connected to a source of electrical power (not shown) such that electrical current flows around both heating elements 38 to the other terminal block 39. Electrical connections are spaced apart by distance "J" and may be clamped or bolted to the terminal blocks 39. Nominal distance "J" is about 20 inches (50.8 cm), but this distance typically ranges from about 4 to 38 inches (10.16 to 96.52 cm).

The terminal strips 40 and bolts 41 maintain electrical contact between the terminal blocks 39 and the heating elements 38. In order to assure good electrical conductivity from the connector end 42 to all parts of the heating element 38, the shape of the terminal block 39 surface contacting the formed heater elements 38 matches the heating element shape (i.e., is arcuate) and the terminal block near the conductor end 42 has a typical cross sectional area of at least about 1.0 in$^2$ (6.4516 cm$^2$), tapering to a typical cross-sectional area at the end distal from the connector end 42 of at least about 0.25 in$^2$ (0.4032 cm$^2$).

The preferred assembled heater 37 has a nominal high temperature resistance of about 30±3 milli-ohm at 1600° C. and a nominal ambient temperature electrical resistance of about 40±4 milli-ohms at 20° C. The high temperature resistance of other embodiments typically ranges from about 10 to 75 milli-ohms, but can be outside this range if required to fit the electrical requirements of the furnace system.

Figure 6A:
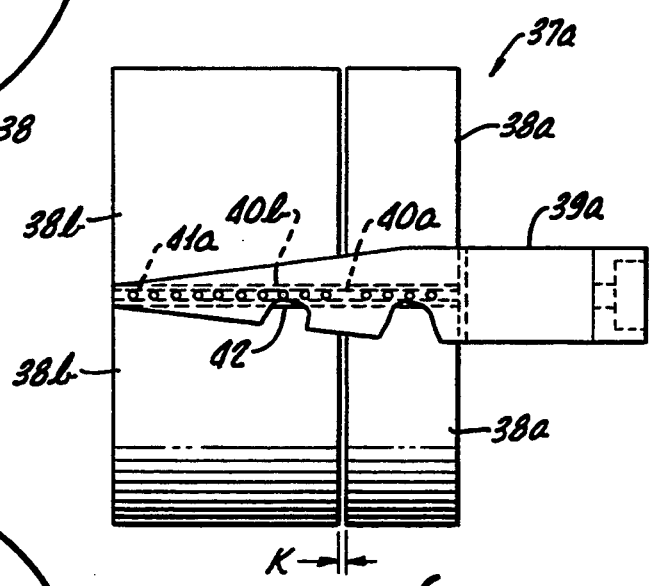
FIGS. 6a and 6b show side and top views of an alternative heater assembly.
Figure 6B:
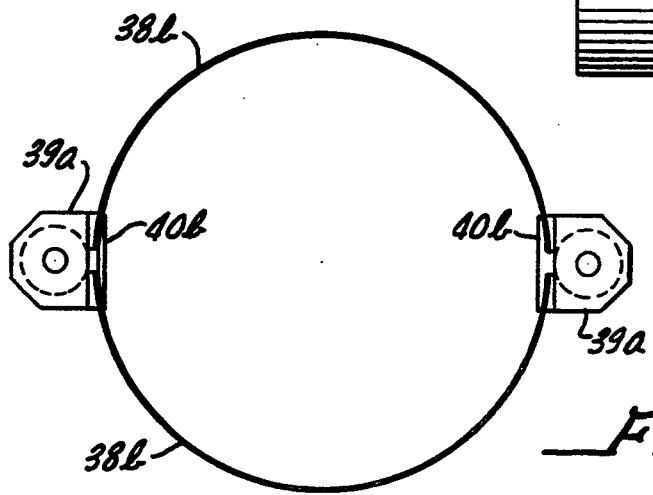

FIGS. 6a and 6b show a side and top view, respectively, of an alternate heater assembly 37a. Instead of the one pair of heating elements 38 (as shown in FIGS. 5a and 5b), two pairs (or more in alternative embodiments) of heating elements 38a and 38b are shown in FIGS. 6a and 6b. This plurality of heating element pairs are attached to alternative terminal blocks 39a, alternative terminal strips 40a and 40b, and alternative bolts 41a. This configuration allows a common attachment means to support and control alternative heating elements 38a and 38b having different materials of construction, different resistances, different thicknesses, and different lengths. The alternative heating elements 38a and 38b are shown spaced apart by distance "K" which is typically at least about 0.1 inch (0.254 cm), but is more typically at least about 0.2 inch (0.508 cm).

The plurality of alternative heating element pairs 38a & 38b, also allow a greater degree of temperature control at different locations. For example, an end heating element pair could generate more heat to compensate for end loses when compared to heating element pairs bordered on both sides by other heating element pairs. A relatively variable workpiece heating rate could also be achieved for workpieces moving along the centerline using multiple elements while maintaining a relatively fixed rate of temperature increase (or decrease).

Figure 7A:
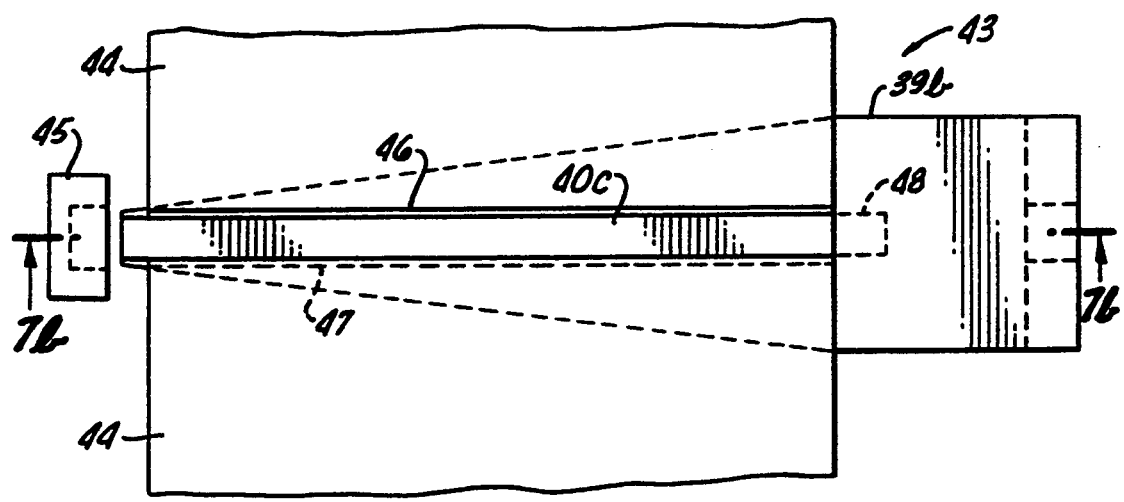
FIGS. 7a and 7b show an alternative method of attaching sheets in a heater assembly.
Figure 7B:
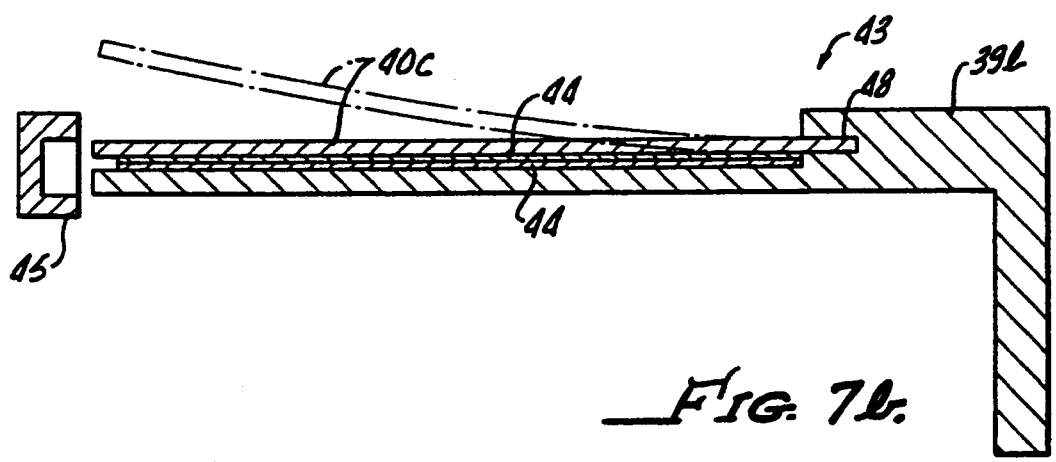

FIGS. 7a and 7b show a partial side and a partial cross-sectional view of a heater assembly 43 constructed from an alternative graphite sheet 44, a second alternative terminal block 39b, a curved terminal strip 40c, and a cap 45. This alternative construction avoids the need for threaded fasteners such as those shown in FIGS. 5 and 6. Alternatively, graphite screws at the top and bottom of each terminal strip can be used. The lengthwise edges 46 and 47 (shown as hidden in FIG. 7a) overlap (or can have abutting edges) at the second alternative terminal block 39b.

The shaped form is retained by the curved terminal strip 40c, normally arcuate in shape as shown dotted as unrestrained in FIG. 7b. One end of curved terminal strip 40c is inserted into cavity 48 of the second alternative terminal bloc 39b. The other end is pressed against the overlapping alternative sheet 44 near edges 46 and 47, deforming the shape as shown in the solid cross-section in FIG. 7b. Straightening of the curved terminal strip 40c squeezes the overlapping sheet ends of the heating elements 44 between the alternative terminal block 39b and the formed terminal strip 40c. The formed end of strip 40c is retained in substantially the constrained shape by cap 45. The cap-retained elastic deformation of curved strip 40c exerts a frictional attaching force clamping the heating element 44 near the edges 46 and 47. The heating elements 44 are thereby retained in the cylindrical shape between the restrained curved strip 40c and the second alternative terminal block 39b.

FIGS. 8a and 8b are top and side views (with partial cross-sections) of a high-temperature radiation heat shield made from graphite sheets 50, 50a, and 50b, attached to an upper and lower graphite ring 49 with graphite screws 52. Three or more concentric graphite sheets or layers, 50, 50a, and 50b, and the graphite ring 49 form multiple cylindrical shapes surrounding a heater (or other element) in a high temperature furnace. In the detail shown in FIG. 8c, the ring 49 has slots 51 for retaining one end of the middle graphite sheets 50a, an exterior screw 52 for retaining an outermost layer 50, and an interior threaded screw 52 for retaining an innermost graphite layer 50b. A corresponding ring 49 is used at the opposite end of the graphite sheets (not shown) to retain the shape. Additional inner sheets 50a can be used to provide additional shielding as required. The graphite sheets 50, 50a, and 50b, are spaced apart by ring 49 to minimize thermal contact and heat conduction between heat shield layers.

Heat shields of this ring and sheet design can also be used in place of heat shields 18 in a silicon crystal growing furnace (see FIG. 1a), in place of thin metal heat shields, in place of conventional graphite shields, and in place of prior art rigid carbon felt heat shields. Compared to refractory sheet metal shields (e.g., composed of molybdenum, tantalum, or tungsten), thin graphite sheets and ring systems are more inert, less contaminating, lighter weight, and more stable. Graphite does not "embrittle" with thermal cycling as some of these refractory metals do.

Forming the cylindrical shapes generally shown herein can be accomplished solely by manual or other mechanical means, but more complex forms and shapes are also achievable. In addition to conical or funnel shapes, examples of more complex shapes that can be derived include elliptical and parabolic shapes.

Complex forming and retaining the thin graphite sheet can also be accomplished by placement in a complex geometry mold. Pressing a sheet into a mold could deform and constrain the sheet and then the mold heated to a set temperature, i.e., a temperature at which the sheet does not return to its unrestrained shape. For the preferred graphite materials of construction (see Table 1), a typical set temperature of at least about 1500° C. is required, more typically a set temperature of at least about 2000° C.

Retaining a shape by raising to set temperature can also produce intermediate shapes which can be further deformed and machined. This can produce very complex element shapes which follow the contour of assembled or intricately shaped work pieces.

Still other alternative embodiments are possible. These include: a fabricated heat shield using graphite sheets and a fibrous graphite layer or other materials (e.g., sandwiching a carbon or graphite felt between two graphite sheets) instead of the empty space between graphite layers shown in FIG. 8a; and providing added insulation at low temperatures and when furnaces are not under a good vacuum conditions.

While the preferred embodiment of the invention has been shown and described, and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. A method of fabricating a graphite furnace element which comprises:
    distorting a flexible graphite sheet having an initial, substantially flat shape and an average thickness of less than about 0.5 cm into a first distorted shape by applying a distorting force;
    constraining said sheet to a second distorted shape similar to said first distorted shape when said distorting force is removed;
    removing said distorting force; and
    exposing said retained shape sheet to an elevated temperature.

2. The method of claim 1 wherein a first edge of said sheet is (1) distal from a second edge of said sheet before said distorting step, and (2) proximate to said second edge after said retaining step.

3. The method of claim 2 wherein said constraining step comprises:
    heating said sheet to a heat treat temperature resulting in a distorted shape set to said sheet; and
    attaching said first edge to said proximate second edge.

4. The method of claim 1 wherein said constraining step comprises:
    placing said distorted sheet substantially within a retaining structure; and
    decreasing said distorting force to allow said distorted shape to at least partially change to said second distorted shape when said sheet is contacting said retaining structure.

5. The method of claim 1 which also comprises attaching a first electrically conductive lead to said sheet.

6. The method of claim 5 which also comprises attaching a second electrically conductive lead to said sheet at a location distal from said first electrically conductive lead.

7. The method of claim 6 wherein a pair of graphite sheets are semi-circularly shaped after said distorting step and are each attached to two electrically conductive leads and wherein said semi-circular shape has a radius of curvature of no smaller than about 7.6 cm.

8. The method of claim 1 which also comprises:
    applying a second distorting force to substantially distort a second graphite sheet having an initial substantially flat shape and an average thickness of less than about 0.5 cm, wherein said second force is capable of distorting said initial flat shape of said second sheet to a second distorted shape; and
    attaching said second distorted shape sheet to said first distorted shape sheet.

9. The method defined in claim 1 wherein said sheet is substantially composed of graphite having a density of at least about 1.75 g/cc and a flexural strength of at least about 10,000 psi, wherein said distorting step produces a shape having a radius of curvature within the range of about 7.6 to 45.7 cm.

10. The method of claim 2 wherein said retaining step comprises inserting said first edge and said second edges into slots in a retaining rib.

11. The method of claim 10 wherein said retaining step also comprises decreasing said distorting force allowing said edges to move within said slots.

12. A method of fabricating a graphite element which comprises:
    applying a distorting force to a graphite sheet having an initial shape and an average thickness of less than about 0.25 cm, said distorting force being capable of substantially distorting said initial shape to a distorted shape;
    constraining said sheet to a second distorted shape when a majority of said distorting force is removed; and
    removing a majority of said distorting force.

13. The method of claim 12 wherein said average thickness is at least 0.0127 cm and which also comprises exposing said retained shape sheet to a temperature of at least 1500° C.

* * * * *

UNITED STATES PATENT AND TRADEMARK OFFICE
CERTIFICATE OF CORRECTION

PATENT NO. : 5,414,927
DATED : May 16, 1995
INVENTOR(S) : Fiel et al.

It is certified that error appears in the above-indentified patent and that said Letters Patent is hereby corrected as shown below:

On the title page,
After Item [76] please insert the following separate item:
-- [73] Assignee: Union Oil Company of California, Los Angeles, California.

Signed and Sealed this

Sixteenth Day of April, 1996

BRUCE LEHMAN

Attest:

*Attesting Officer*    *Commissioner of Patents and Trademarks*